US007825988B2

(12) United States Patent
Suwa et al.

(10) Patent No.: US 7,825,988 B2
(45) Date of Patent: Nov. 2, 2010

(54) VEHICLE-MOUNTED DISPLAYING DEVICE EMPLOYING TV PROGRAM DISPLAYING METHOD

(75) Inventors: Manae Suwa, Tokyo (JP); Takao Yahiro, Tokyo (JP); Yusaku Yoshitani, Tokyo (JP); Masashi Watanabe, Tokyo (JP); Isao Katano, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 1155 days.

(21) Appl. No.: 11/232,849

(22) Filed: Sep. 22, 2005

(65) Prior Publication Data

US 2006/0066762 A1 Mar. 30, 2006

(30) Foreign Application Priority Data

Sep. 28, 2004 (JP) ............................. 2004-281255

(51) Int. Cl.
*H04N 5/445* (2006.01)
(52) U.S. Cl. ..................... 348/563; 348/837; 348/564; 348/565; 348/739
(58) Field of Classification Search ................. 348/837, 348/840, 14.07, 14.11, 705, 706, 564, 565, 348/563, 739; 701/200, 212, 213; 725/75
See application file for complete search history.

(56) References Cited

U.S. PATENT DOCUMENTS

| 5,557,338 | A | 9/1996 | Maze et al. |
| 5,818,541 | A | 10/1998 | Matsuura et al. |
| 6,144,920 | A * | 11/2000 | Mikame ..................... 701/212 |
| 6,868,332 | B2 | 3/2005 | Hashimoto |
| 6,954,185 | B2 * | 10/2005 | Ogino .......................... 345/7 |
| 2003/0007227 | A1 | 1/2003 | Ogino |

FOREIGN PATENT DOCUMENTS

| EP | 1 061 340 A2 | 6/2000 |
| JP | SHO 60-74881 | 4/1985 |
| JP | HEI 7-4981 | 1/1995 |
| JP | HEI 11-196436 | 7/1999 |
| JP | 2002-101355 A | 4/2002 |
| JP | 2003189204 | 7/2003 |
| JP | 2004-180201 | 6/2004 |
| JP | 2004-180338 | 6/2004 |

* cited by examiner

Primary Examiner—David L Ometz
Assistant Examiner—Jean W Désir
(74) Attorney, Agent, or Firm—Day Pitney LLP

(57) ABSTRACT

A vehicle-mounted device is configured to execute a predetermined function as a foreground process and a TV function as a background process. The vehicle-mounted device is provided with a displaying device. An image corresponding to the predetermined function is displayed on the displaying device when the predetermined function is executed. The device further includes a TV program switching system, a small image generating system that generates a small image when the program switching system is operated to switch the TV programs. The small image is superimposed on the image corresponding to the predetermined function. The device further includes a display control system that displays the small image on the displaying devices such that the small image is superimposed on the image corresponding to the predetermined function, the display control system extinguishing the small image at a predetermined timing.

20 Claims, 3 Drawing Sheets

VEHICLE-MOUNTED DISPLAYING DEVICE EMPLOYING TV PROGRAM DISPLAYING METHOD

INCORPORATION BY REFERENCE

The present disclosure relates to the subject matter contained in Japanese Patent Application No. 2004-281255, filed on Sep. 28, 2004, which is expressly incorporated herein by reference in its entirety.

BACKGROUND OF THE INVENTION

Aspects of the invention relate to a TV program displaying method and a vehicle-mounted displaying device employing such a method.

A vehicle-mounted device such as a car navigation system generally includes a displaying device and has a function of displaying a TV program on the displaying device. Such a vehicle-mounted device is typically configured such that a TV function is executed as a background process, while, for example, the navigation function can be executed as a foreground process when the vehicle (e.g., a car) is being driven to run. That is, a TV screen is not displayed when the vehicle driven and only the sound of the TV program currently selected is output. An example of such a vehicle-mounted device is disclosed in Japanese Patent Provisional Publication No. P2002-101355A (hereinafter, simply referred to as '355 publication).

In a case of the car navigation system, when the navigating function is executed as the foreground process and the TV function is executed as the background process, a map for navigation is displayed on the displaying device, while the sound of the TV program is output from a speaker. In such a situation, if a user of the car navigation system switches a TV channel to another program, the sound is switched to the changed program. According to the '355 publication, in such a case, information regarding the switched channel (e.g., a TV station name, channel number, etc.) is superimposed, in the form of text, on the navigation map.

Sometimes, such text information is insufficient to recognize the content of the switched program. It may be possible to display further information regarding the switched TV channel. However, too much information may hinder the image for the navigation, which obstacles a driver from driving using the navigation function. Further, too much text information requires the driver's attention, which should be avoided in view of safety driving.

SUMMARY OF THE INVENTION

Aspects of the invention provide an improved vehicle-mounted displaying device allowing a user to easily recognize the content of a TV program when the TV channel is switched while the TV function is executed as a background process with suppressing hindering affect to the foreground function such as the navigation function.

Aspects of the invention provide a vehicle-mounted device capable of executing a predetermined function as a foreground process and a TV function as a background process. The vehicle-mounted device is provided with a displaying device, an image corresponding to the predetermined function being displayed on the displaying device when the predetermined function is executed, a program switching system that is operated by a user to switch TV programs one by one, a small image generating system that generates a small image which is smaller than the image corresponding to the predetermined function when the program switching system is operated to switch the TV programs, the small image being superimposed on the image corresponding to the predetermined function, and a display control system that displays the small image on the displaying devices such that the small image is superimposed on the image corresponding to the predetermined function, the display control system extinguishing the small image at a predetermined timing.

The predetermined timing may be a timing at which a predetermined time has elapsed after the small image was displayed on the displaying device.

The vehicle-mounted device may further include a text information displaying system that displays text information related to the switched TV program only when the small image is being displayed on the displaying device.

If the program switching system is operated to switch the TV programs when the small image is being displayed, the display control system may immediately extinguish the small image and display a small image which is generated by the small image generating system corresponding to the switched TV program.

The vehicle-mounted device may further include a drive detection system that detects whether the vehicle is running, and the display control system may not display the small image when the drive detection system detects that the vehicle is running.

The vehicle-mounted device may further include a drive detection system that detects whether the vehicle is running, and the display control system may immediately extinguish the small image if the drive detection system detects that the vehicle is running while the small image is being displayed.

The predetermined function may be a car navigation function.

Aspects of the invention provide a method of displaying a TV program for a vehicle-mounted device capable of executing a predetermined function as a foreground process and a TV function as a background process, the vehicle-mounted device having a displaying device that is configured to display an image corresponding to the predetermined function when the predetermined function is executed. The method includes the steps of switching TV programs from a current program to another program, generating a small image which is smaller than the image corresponding to the predetermined function when the TV program is switched to current one to the other, displaying the small image such that the small image is superimposed on the image corresponding to the predetermined function, and extinguishing the small image at a predetermined timing.

The predetermined timing may be a timing at which a predetermined time has elapsed after the small image was displayed on the displaying device.

The method may further include a step of displaying text information related to the switched TV program only when the small image is being displayed on the displaying device.

If the TV program is switched from the current program to the other when the small image corresponding to the current program is being displayed, the small image may be extinguished immediately, and a small image corresponding to the other program may be generated and displayed on the displaying device.

The method may further include a step of detecting whether the vehicle is running. The step of displaying the small image may not display the small image when the vehicle is detected to be running.

The method may further include a step of detecting whether the vehicle is running. The step of displaying may immediately extinguish the small image if the drive detection system detects that the vehicle is running while the small image is being displayed.

The predetermined function may be a car navigation function.

Aspects of the invention further provide a vehicle-mounted device capable of executing a first function as a foreground process and a second function as a background process. The vehicle-mounted device is provided with a displaying device, a first image generating system that generates a first image corresponding to the first function, a second image generating system that generates a second image corresponding to the second function, the second image being smaller than the first image, a switching system that is operated by a user to switch an operational condition of the second function, and a display control system that displays the small image on the displaying devices such that the small image is superimposed on the image corresponding to the predetermined function. The second image generating system is configured to generate the second image when the switching system is operated to switch the operational condition of the second function, and the display control system extinguish the second image at a predetermined timing after displayed on the displaying device.

The predetermined timing may be a timing at which a predetermined time has elapsed after the second image was displayed on the displaying device.

The vehicle-mounted device may further include a text information displaying system that displays text information related to the switched operational condition only when the second image is being displayed on the displaying device.

If the switching system is operated to switch the operational condition when the second image is being displayed, the display control system may immediately extinguish the second image and display a second image which is generated by the second image generating system corresponding to the switched operational condition.

The vehicle-mounted device may further include a drive detection system that detects whether the vehicle is running. The display control system may not display the second image when the drive detection system detects that the vehicle is running.

The vehicle-mounted device may further include a drive detection system that detects whether the vehicle is running. The display control system may immediately extinguish the second image if the drive detection system detects that the vehicle is running while the second image is being displayed.

BRIEF DESCRIPTION OF THE ACCOMPANYING DRAWINGS

DETAILED DESCRIPTION OF THE EMBODIMENT

Referring to accompanying drawings, a vehicle-mounted device 100 according to an embodiment of the invention will be described in detail.

Figure 1:
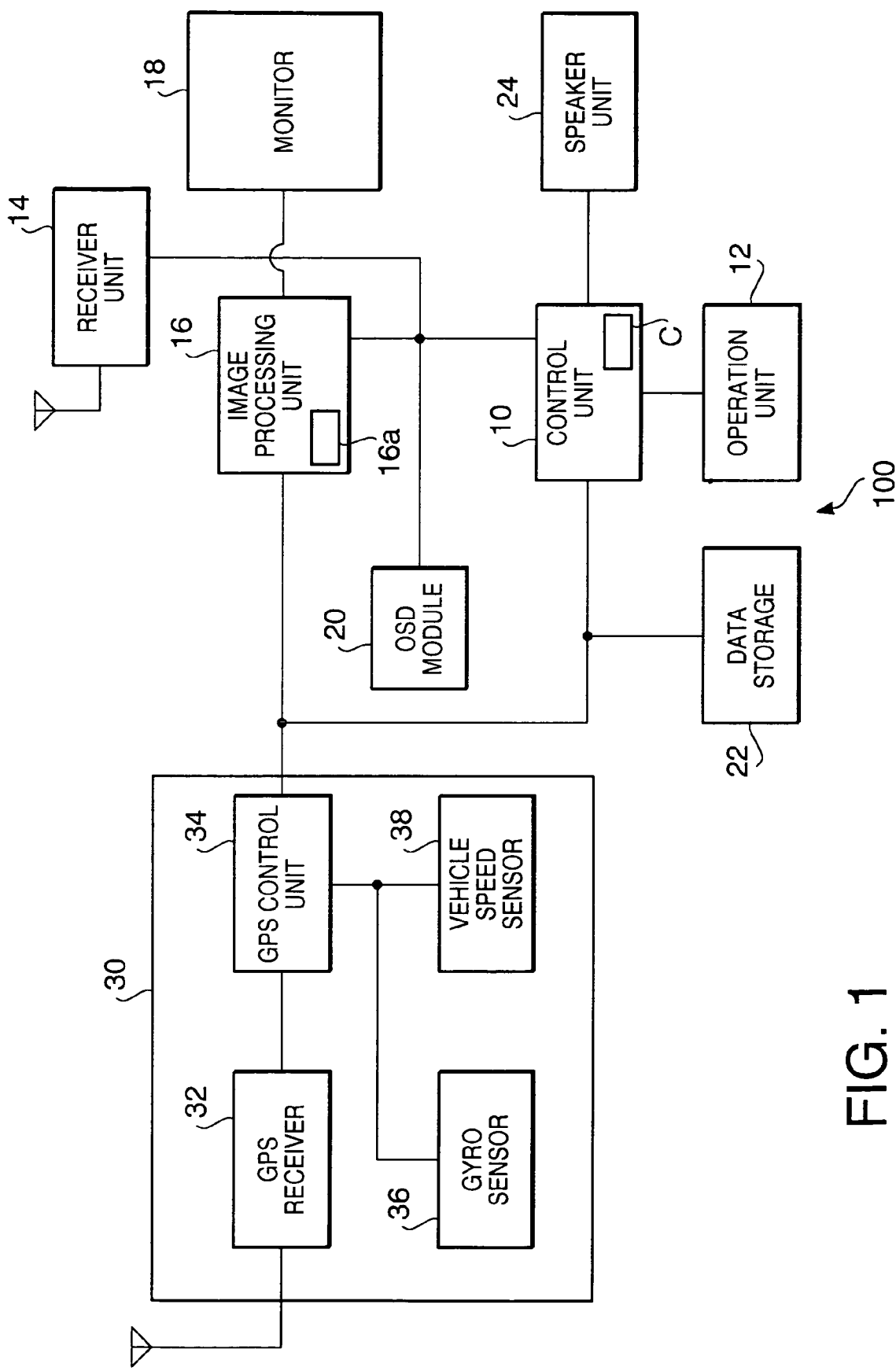
FIG. 1 is a block diagram showing a system configuration of a vehicle-mounted device according to an embodiment of the invention.
Figure 2A:
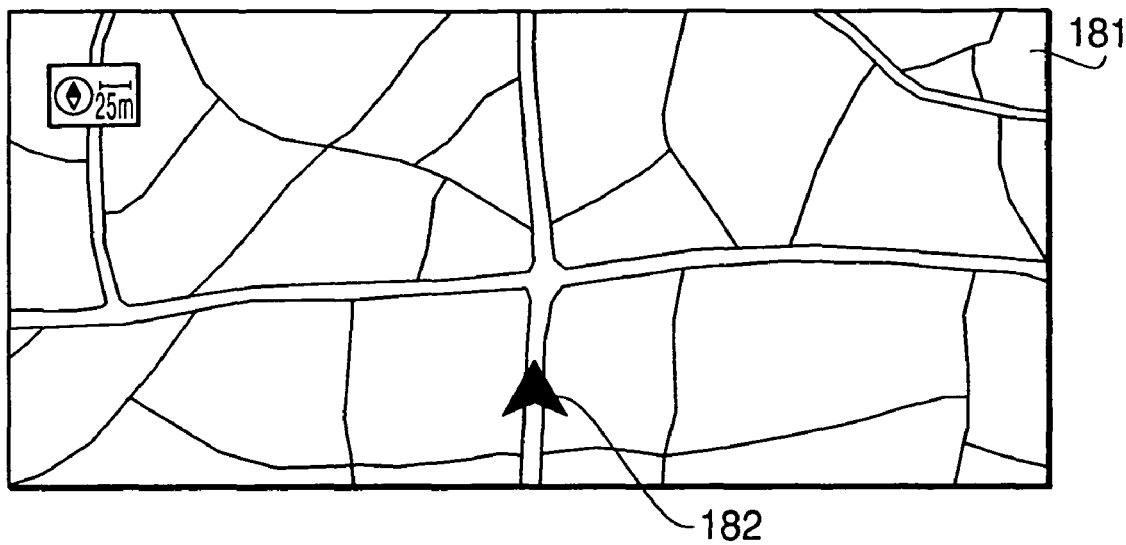
FIGS. 2A and 2B show exemplary screen images displayed on the vehicle-mounted device according to the embodiment of the invention.
Figure 2B:
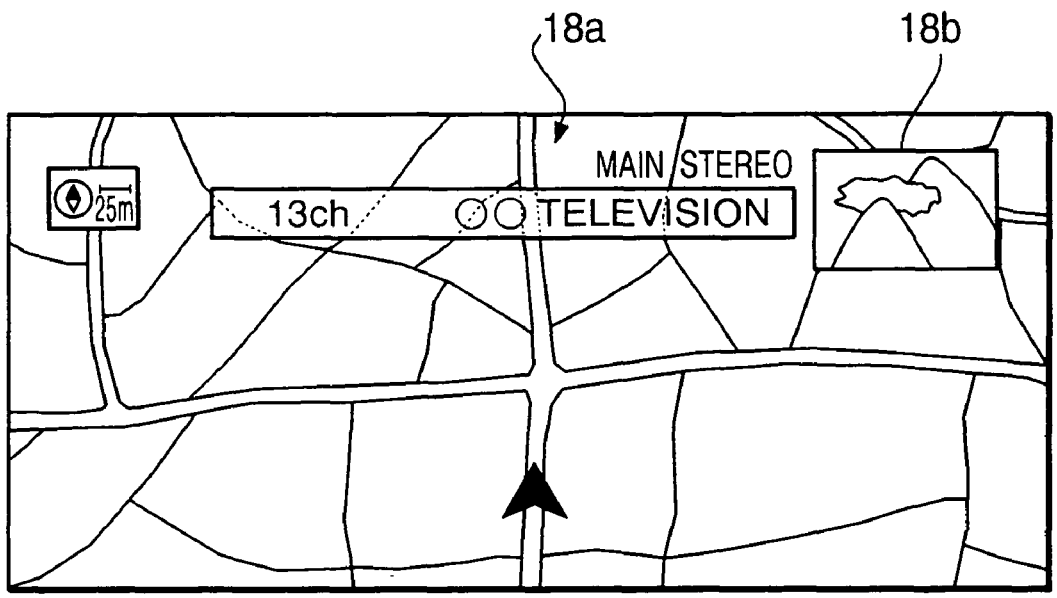

FIG. 1 is a block diagram showing a system configuration of a vehicle-mounted device 100. FIGS. 2A and 2B show exemplary screen images displayed on the vehicle-mounted device 100.

The vehicle-mounted device 100 has a so-called car navigation function, which guides a driver to a destination. The vehicle-mounted device 100 is provided with, as shown in FIG. 1, a control unit 10 that controls the entire operation of the vehicle-mounted device 100, an operation unit 12 through which a user can operate the vehicle-mounted device, and a receiver unit 14 configured to receive a TV broadcast wave. The operation unit 12 may be a remote controller (either wired or wireless) and/or one or more switches (e.g., button switches) provided to the vehicle-mounted device 100. The receiver unit 14 is provided with an antenna for receiving TV broadcast waves, and a tuner for selecting TV channels. Typically, a tuning (i.e., selection of a TV channel) is executed through the operation unit 12.

Further, the vehicle-mounted device 100 is provided with a data storage 22 that stores various pieces of data including digital map data and audio data for navigation, and other data as well, and an image processing unit 16 that generates TV picture based on an image signal included in the TV broadcast wave received by the receiver unit 14. The vehicle-mounted device 100 is further provided with a monitor 18 for displaying TV picture, an image of a map for navigation generated by the image processing unit 16, and the like.

The vehicle-mounted device 100 is further provided with a GPS (Global Positioning System) unit 30 that obtains a current position of the vehicle on which the vehicle-mounted device (and thus, the GPS unit 30) is mounted. The GPS unit 30 includes a GPS receiver 32 that receives GPS signals output from the GPS satellites, a GPS control unit 34 that control the entire operation of the GPS unit 30, a gyro sensor 36 for measuring an angular speed of the vehicle, and a vehicle speed sensor that generates a vehicle speed pulse signal in response to rotation of driving tires on both right and left sides of the vehicle.

First, a process of displaying an image of a map for navigation on the monitor 18 will be described. The GPS control unit 34 carries out dead reckoning (hereinafter, abbreviated as DR) in accordance with the signals output by the gyro sensor 36 and the vehicle speed sensor 38. The DR is a operation to calculate a direction in which the vehicle is heading or oriented and a distance the vehicle has ran. Then, based on the results of the DR and result of the GPS measurement, digital image data around the current location of the vehicle is extracted from the data storage 22. The thus extracted digital map data is transmitted to the image processing unit 16.

The image processing unit 16 applies a D/A (digital-to-analog) conversion the extracted map to generate a video signal representing an image of the map, and outputs the image of the map as converted to the monitor 18 together with a vehicle location mark indicative of a current location of the vehicle on the map. As shown in FIG. 2A, on a screen of the monitor 18, the map 181 around the current location of the vehicle is displayed, and the vehicle location mark (a black arrowhead in this figure) 182 is also displayed on the map. Specifically, the vehicle location mark 182 is displayed at a predetermined position on the screen of the monitor 18, and the map in the neighborhood of the vehicle is displayed on the entire area of the screen of the monitor 18.

Next, a process for reproducing voice messages (i.e., outputting the audio data from the speaker unit 24) will be described. When the voice messages a reproduced, the control unit 10 retrieves an appropriate piece of audio data from the data storage 22 in accordance with the results of the DR and GPS measurement, digital map data corresponding to the current location and in the neighborhood of the vehicle, and the orientation and the current location of the vehicle, and transmits the retrieved data to the speaker unit 24. Then, the speaker unit 24 drives a speaker included therein to output the voice message for the navigation.

A process for displaying TV picture on the monitor 18 and reproducing TV sound. The receiver unit 14 receives the TV broadcast wave, and the tuner function thereof outputs the broadcast wave of the selected channel to the control unit 10. The control unit 10 extracts the video signal included in the broadcast wave as selected and transmits the extracted video signal to the image processing unit 16. At the same time, the control unit 10 extracts the audio signal included in the broadcast wave.

The image processing unit 16 converts the input video signal into a brightness signal and color difference signals, and stores the converted signals in a memory 16a provided to the image processing unit 16 as video data. According to the embodiment, the memory 16a consists of a plurality of memory areas respectively storing the brightness signal and color difference signals. The image processing unit 16 reads the video data synchronously with a synchronizing signal for readout, which is output by the control unit 1 to generate a screen of an image and transmits the image to the monitor 18. Then, on the monitor 18, the TV picture is displayed on the full screen of the displaying area thereof. At the same time, the control unit 10 applies a predetermined processing to the extracted audio signal and transmits the same to the speaker unit 24, then the TV sound is reproduced.

The vehicle-mounted device 100 further includes an OSD (On Screen Display) module 20, which generates text information to be displayed on the monitor 18 as shown in FIG. 2B.

A process for generating the text information using the OSD module 20 will be described in detail. The control unit 10 obtains the TV channel information representing the selected TV channel, which is selected through the operation unit 12, and retrieves corresponding data from the data storage 22. The data to be retrieved includes, for example, a name of each broadcasting station and channel number thereof, which have been stored in the data storage 22 in advance. Then, the control unit 10 retrieves text data corresponding to the obtained TV channel information, and transmits the retrieved text data to the OSD module 20.

The OSD module 20 generates character images indicating the name of the broadcasting station, channel number and the like in accordance with the received text data, and transmits the generated images to the image processing unit 16. The image processing unit 16 the superimposes the character images on the image (e.g., the image of the navigation map or TV picture) displayed on the monitor 18 as shown in FIG. 2B.

It should be noted that the character images generated by the OSD module 20 and displayed on the monitor 18 need not be limited to the information related to the receiving TV channel. For example, the character information 18a displayed on the monitor may include information related to the TV sound, which may included whether the TV sound is stereo sound or monaural sound, or whether the TV sound is main sound or sub sound, as indicated in FIG. 2B. Further, the OSD module 20 may generate an image of a box surrounding the displayed channel information (see FIG. 2B). A position where the character information 18a is displayed need not be limited to the position shown in FIG. 2B, but may be displayed at any position, for example, at a lower end portion on the screen of the monitor 18.

According to the embodiment, the vehicle-mounted device 100 is configured to inhibit displaying the TV picture when the vehicle is running so that the driver concentrates on driving, and to allow display of the TV picture when the vehicle stops. Specifically, the control unit 10 checks the signal output by the vehicle speed sensor 38 to determine whether the vehicle is running or not based on the signal output by the vehicle speed sensor 38.

When the control unit 10 detects that the car is running, the control unit 10 forcibly change the image displayed on the monitor 18 form TV picture (if displayed) to the map image (or other images such as an image representing the information related to medium such as a CD being played). The control unit 10 does not allow monitor 18 to display the TV picture when the vehicle is detected to be running. That is, as far as the vehicle is running, the TV picture will not be displayed on the monitor 18.

When the control unit 10 detects that the cur is not running (e.g., the car is parking), no inhibition regarding displaying of the TV picture is performed. Thus, when the car stops, the user can make monitor 18 to display the TV picture if the TV broadcast wave can be received. The control unit 10 may judge whether the vehicle is running based on another condition. For example, the control unit 10 may judge whether the car is running based on a position of a shift lever of the vehicle. That is, the control unit 10 may be configured to determine that the vehicle is not running when the shift lever is located at a parking position or a neutral position, and determine that the vehicle is running when the shift lever is located at another position (e.g., a back position or a drive position).

The vehicle-mounted device 100 is configured such that the navigation function is executed as a foreground process, while the TV function is executed as a background process. On the monitor 18, a map is displayed for navigation, while the TV sound is output from the speaker 24. Typically, the TV sound is temporarily lowered or muted when a voice message for the navigation is output from the speaker 24. When the car is parking, or not running, by operating the operation unit 12, the user can switch the map and TV picture as the image displayed on the monitor 18.

When the TV function is executed as the background process, user only hear the TV sound. Therefore, when the user operates the operation unit 12 to switch the TV channels, it is difficult for the user to recognize a content of a TV program of a newly selected TV channel. According to the vehicle-mounted device 100, a picture-in-picture system is employed. That is, when the map image is displayed in accordance with the main process (i.e., the navigation process), a small window (hereinafter, referred to as a child screen) 18b (see FIG. 2B) is displayed on the main screen of the monitor 18, and the TV picture is displayed in the child screen 18b. It should be noted that the child screen 18b is displayed temporarily only for allowing the user to recognize the content of the switched TV channel.

Hereinafter, generation of the child screen 18b displaying the TV picture will be described in detail.

If the video signal of the TV broadcast is normally processed as mentioned above, the TV picture covering the entire area of the main screen of the monitor 18 is generated. In order to generate the small-sized child window 18b, the image processing unit 16 applies a filtering process in which part of the TV picture data is eliminated to reduce the displaying size of the entire image and further the reduced TV picture data is processed so that the reduced TV picture appears smoothly when displayed on the child screen 18b. With this process, on the monitor 18, the childe screen 18b displaying the TV picture is generated inside the main screen displaying the map.

It should be noted that since the child screen 18b is displayed to assist the user to recognize the content of the selected TV program, the image shown in the childe screen 18b can be either an animating picture or a still image representing a frame of the TV picture. When the animating picture is displayed on the child screen 18b, a frame rate of the animating picture may be reduced in order to reduce load to the image processing unit 16.

A location of the childe screen 18b in the main screen need not be limited to the location shown in FIG. 2B, and may be any position (e.g., at a lower portion) on the main screen. Further, the size of the child screen 18b need not be limited to the size shown in FIG. 2B, and can be either larger or smaller. Optionally, the vehicle-mounted device 100 may be configured such that the location and/or the size of the childe screen 18b can be determined and set by the user, for example, through the operation unit 12. In such a case, the user can determine an appropriate size and/or location through the operation unit 12, and minimize the interference by the child screen 18b with respect to the main screen (i.e., the map or other images of foreground process). Importantly, according to the embodiment, the child screen 18b remains displayed only for a predetermined period. Thereafter, the child screen 18b disappears and the user can view the entire image of the main screen of the monitor 18, which is displayed in accordance with the foreground process.

Figure 3:
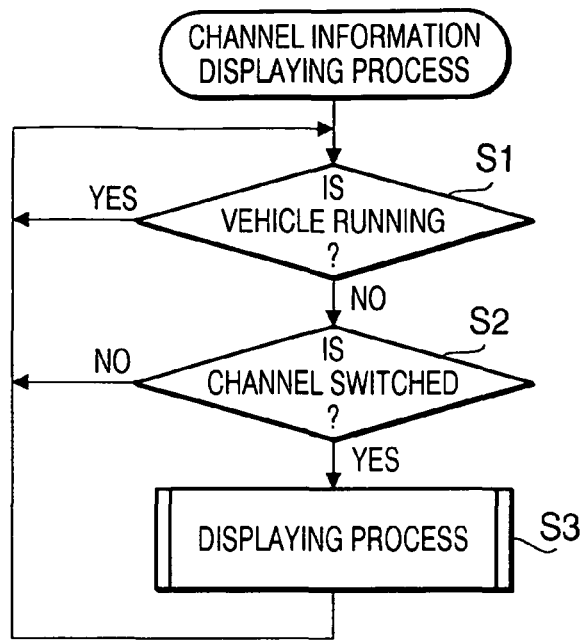
FIG. 3 is a flowchart illustrating a channel information displaying process according to the embodiment of the invention.

FIG. 3 is a flowchart illustrating a channel information displaying process executed in the vehicle-mounted device 100.

The channel information displaying process shown in FIG. 3 is started when the TV function is started as the background process while the navigation function (or another, non-TV function) is executed as the foreground function. The channel information displaying process is finished when the vehicle-mounted device 100 is powered OFF, or the TV functions is switched to the foreground process.

When both the navigation function and the TV function are executed, the navigation map is displayed on the monitor 18 as shown in FIG. 2A, and from the speaker 24, the TV sound is output as mentioned above. It should be noted that when another function is executed as the foreground process, another image (e.g., an image of a web site) corresponding to the foreground process is displayed instead of the navigation map. In the following description, it is assumed that the navigation function is executed as the foreground process for the sake of explanation.

When the channel information displaying process is started, the control unit 10 checks the signal output by the vehicle speed sensor 38 to determine whether the vehicle is running or not (S1). If the vehicle is determined to be running (S1: YES), the control unit 10 repeats S1 at every predetermined period. If the control unit 10 determined that the vehicle is parking (not running) (S1: NO), the control unit 10 judges whether a TV channel is switched by user's operation of the operation unit 12 (S2). If the channel is switched (S2: YES), the control unit 10 executes S3 at which a subroutine, displaying process is called. If the channel is not switched (S2: NO), the control unit 10 executes S1.

Figure 4:
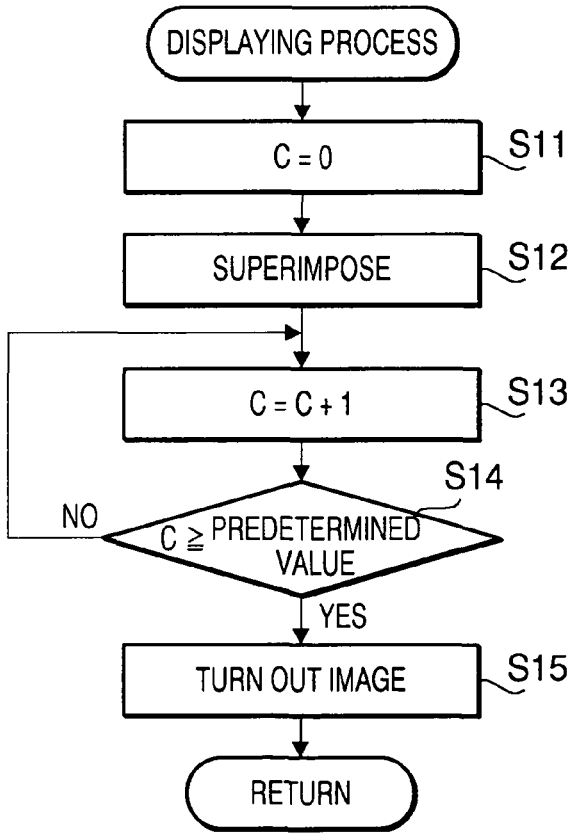
FIG. 4 is a flowchart illustrating a displaying process, which is a subroutine called in the channel information displaying process show in FIG. 3.

FIG. 4 is a flowchart illustrating a displaying process, which is a subroutine called in the channel information displaying process show in FIG. 3. The control unit 10 keeps checking the vehicle speed sensor 38 even when the displaying process is executed. If it is detected that the vehicle starts running when the displaying process is executed, the control unit 10 turns out the character information 18a and the childe screen 18b, and returns to the channel information displaying process, therefore S1 is executed.

When the displaying process is started, the control unit 10 sets a counter C (see FIG. 1) built in the control unit 10 to zero (S11). In S12, control unit 10 controls the image processing unit 16 to superimpose the character information 18a and the child screen 18b as shown in FIG. 2B (S12). Thereafter, the control unit 10 increments the counter C by one (S13), and judges whether the value of the counter C is equal to or greater than a predetermined value (S14). If the value of the counter C is smaller than the predetermined value (S14: NO), the control unit 10 returns to S13 and increments the counter C. Thus, S13 and S14 are repeated until the value of the counter C becomes equal to the predetermined value. When the value of the counter C is equal to or greater than the predetermined value (S14: YES), which means that a predetermined time period has passed since the displaying process was called in S3 of the channel information displaying process, the control unit 10 controls the image processing unit 16 to turn out the character information 18a and the child screen 18b (S15). When the displaying process is finished, process returns to the channel information displaying process, and S1 is executed.

If switching of the TV channel is detected while the subroutine shown in FIG. 4 is being executed, then, regardless of whichever step of the displaying process is being executed, the control unit 10 turns out the currently displayed channel information and executes S11. Then, the character information 18a and the child screen 18b for the newly selected TV channel are superimposed on the image displayed on the monitor 18.

As described above, even if the TV channel is switched while the navigation image (i.e., the navigation map) is displayed on the monitor 18, the information corresponding to the newly selected TV channel, in particular, the child screen 18b showing the TV picture of the newly selected TV channel, is superimposed on the navigation image. Therefore, the user can recognize the content of the selected TV channel quickly and correctly. Further, the childe screen 18b is automatically extinguished after a predetermined period has passed. The "predetermined period" is a sufficiently short period which enables the user to recognize the content of the selected TV channel. Therefore, the display of the child screen 18b on the monitor 18 dose not substantially hinder the display of the navigation image, or the hindrance by the child screen 18b to the navigation image is minimized. In addition, the size of the TV picture is displayed on the child screen 18b, which also contribute to reduce hindrance by the TV image to the navigation image.

What is claimed is:

1. A vehicle-mounted device capable of executing a predetermined function as a foreground process and a TV function as a background process, comprising:

a displaying device, an image corresponding to the predetermined function being displayed on the displaying device when the predetermined function is executed;

a program switching system that is operated by a user to switch TV programs one by one;

an output of sound, corresponding to the selected TV program;
- a small image generating system that generates a small image which is smaller than the image corresponding to the predetermined function when the program switching system is operated to switch the TV programs, the small image being superimposed on the image corresponding to the predetermined function;
- said small image generated by said small image generating system representing an image of a TV program that has been switched by the program switching system; and
- a display control system that displays the small image on the displaying devices such that the small image is superimposed on the image corresponding to the predetermined function for a predetermined amount of time, the display control system extinguishing the small image at a predetermined timing, and an output of sound, corresponding to the TV program switched by the program switching system at the time of operation by the user, remains as the output of sound after the small image is extinguished.

2. The vehicle-mounted device according to claim 1, wherein the predetermined timing is a timing at which a predetermined time has elapsed after the small image was displayed on the displaying device.

3. The vehicle-mounted device according to claim 1, further including a text information displaying system that displays text information related to the switched TV program only when the small image is being displayed on the displaying device.

4. The vehicle-mounted device according to claim 1, wherein, if the program switching system is operated to switch the TV programs when the small image is being displayed, the display control system immediately extinguishes the small image and displays a small image which is generated by the small image generating system corresponding to the switched TV program.

5. The vehicle-mounted device according to claim 1, further including a drive detection system that detects whether the vehicle is running, wherein the display control system does not display the small image when the drive detection system detects that the vehicle is running.

6. The vehicle-mounted device according to claim 1, further including a drive detection system that detects whether the vehicle is running, wherein the display control system immediately extinguishes the small image if the drive detection system detects that the vehicle is running while the small image is being displayed.

7. The vehicle-mounted device according to claim 1, wherein the predetermined function is a car navigation function.

8. A method of displaying a TV program for a vehicle-mounted device capable of executing a predetermined function as a foreground process and a TV function as a background process, the vehicle-mounted device having a displaying device that is configured to display an image corresponding to the predetermined function when the predetermined function is executed, the method comprising:
- switching TV programs at the time of operation by a user from a current program to another program;
- generating an output of sound, corresponding to the selected TV program;
- generating a small image which is smaller than the image corresponding to the predetermined function when the TV program is switched to current one to the other;
- said generated small image representing an image of a TV program that has been switched;
- displaying the small image such that the small image is superimposed on the image corresponding to the predetermined function for a predetermined amount of time;
- extinguishing the small image at a predetermined timing, and
- generating an output sound corresponding to the TV program switched as a result of the operation by the user even after the small image is extinguished.

9. The method according to claim 8, wherein the predetermined timing is a timing at which a predetermined time has elapsed after the small image was displayed on the displaying device.

10. The method according to claim 8, further including displaying text information related to the switched TV program only when the small image is being displayed on the displaying device.

11. The method according to claim 8, wherein, if the TV program is switched from the current program to the other when the small image corresponding to the current program is being displayed, the small image is extinguished immediately, a small image corresponding to the other program being generated and displayed on the displaying device.

12. The method according to claim 8, further including detecting whether the vehicle is running, wherein the displaying the small image does not display the small image when the vehicle is detected to be running.

13. The method according to claim 8, further including a drive detection system that detects whether the vehicle is running, wherein the display control system immediately extinguishes the small image if the drive detection system detects that the vehicle is running while the small image is being displayed.

14. The method according to claim 8, wherein the predetermined function is a car navigation function.

15. A vehicle-mounted device capable of executing a first function as a foreground process and a second function as a background process, comprising:
- a displaying device;
- a first image generating system that generates a first image corresponding to the first function;
- a second image generating system that generates a second image corresponding to the second function, the second image being smaller than the first image;
- a sound generating system generating an output of sound corresponding to the second function,
- a switching system that is operated by a user to switch an operational condition of the second function; and
- a display control system that displays the small image on the displaying devices such that the small image is superimposed on the image corresponding to the predetermined function,
- wherein the second image generating system generates the second image when the switching system is operated to switch the operational condition of the second function for a predetermined amount of time;
- said second image generated by said second image generating system representing an image of a TV program that has been switched by the switching system, and
- wherein the display control system extinguishing the second image at a predetermined timing after displayed on the displaying device, and
- the sound generating system generating the output sound corresponding to the TV program switched by the switching system at the time of operation by the user even after the small image is extinguished.

16. The vehicle-mounted device according to claim 15, wherein the predetermined timing is a timing at which a predetermined time has elapsed after the second image was displayed on the displaying device.

17. The vehicle-mounted device according to claim 15, further including a text information displaying system that displays text information related to the switched operational condition only when the second image is being displayed on the displaying device.

18. The vehicle-mounted device according to claim 15, wherein, if the switching system is operated to switch the operational condition when the second image is being displayed, the display control system immediately extinguishes the second image and displays a second image which is generated by the second image generating system corresponding to the switched operational condition.

19. The vehicle-mounted device according to claim 15, further including a drive detection system that detects whether the vehicle is running,
wherein the display control system does not display the second image when the drive detection system detects that the vehicle is running.

20. The vehicle-mounted device according to claim 15, further including a drive detection system that detects whether the vehicle is running,
wherein the display control system immediately extinguishes the second image if the drive detection system detects that the vehicle is running while the second image is being displayed.

* * * * *